(12) United States Patent
Ha

(10) Patent No.: US 11,919,266 B2
(45) Date of Patent: Mar. 5, 2024

(54) SHOE SOLE OR INSOLE HAVING SHEET-TYPE COATED CORK COUPLED THERETO, AND METHOD FOR MANUFACTURING SAME

(71) Applicant: Won Tae Ha, Kobe (JP)

(72) Inventor: Won Tae Ha, Kobe (JP)

( * ) Notice: Subject to any disclaimer, the term of this patent is extended or adjusted under 35 U.S.C. 154(b) by 623 days.

(21) Appl. No.: 17/271,092

(22) PCT Filed: Jun. 24, 2019

(86) PCT No.: PCT/KR2019/007580
§ 371 (c)(1),
(2) Date: Feb. 24, 2021

(87) PCT Pub. No.: WO2020/045805
PCT Pub. Date: Mar. 5, 2020

(65) Prior Publication Data
US 2021/0245467 A1 Aug. 12, 2021

(30) Foreign Application Priority Data
Aug. 29, 2018 (KR) .......... 10-2018-0102266

(51) Int. Cl.
*B32B 9/02* (2006.01)
*B29D 35/14* (2010.01)
*B32B 9/04* (2006.01)
*B32B 37/10* (2006.01)

(52) U.S. Cl.
CPC .......... *B29D 35/142* (2013.01); *B32B 9/02* (2013.01); *B32B 9/043* (2013.01); *B32B 37/10* (2013.01); *B32B 2317/02* (2013.01); *B32B 2437/02* (2013.01)

(58) Field of Classification Search
None
See application file for complete search history.

(56) References Cited

U.S. PATENT DOCUMENTS

| 4,627,179 A * | 12/1986 | McElroy ......... A43B 17/14 36/71 |
| 4,977,691 A * | 12/1990 | Orchard .......... A43B 5/00 36/180 |
| 2006/0118355 A1 * | 6/2006 | Blomeling ........ B29C 67/205 181/294 |
| 2015/0166223 A1 * | 6/2015 | Yamamoto ....... B65D 51/005 215/364 |

FOREIGN PATENT DOCUMENTS

| JP | 2002-320503 A | 11/2002 |
| JP | 2006-328167 A | 12/2006 |
| KR | 10-2001-0074399 A | 8/2001 |
| KR | 10-2002-0089604 A | 11/2002 |
| KR | 10-1661515 B1 | 9/2016 |
| KR | 10-1869049 B1 | 6/2018 |
| KR | 10-1961677 B1 | 3/2019 |

OTHER PUBLICATIONS

International Search Report for PCT/KR2019/007580 dated Oct. 1, 2019 from Korean Intellectual Property Office.

* cited by examiner

*Primary Examiner* — Sheeba Ahmed
(74) *Attorney, Agent, or Firm* — Paratus Law Group, PLLC

(57) ABSTRACT

Disclosed is a sole-type body member, which is a main body of a shoe sole or an insole, is laminated on the sheet-type coated cork, and is then pressed and heated so that a part of the sole-type body member is inserted into the main-body-coupling opening, thereby achieving coupling therebetween.

3 Claims, 3 Drawing Sheets

SHOE SOLE OR INSOLE HAVING SHEET-TYPE COATED CORK COUPLED THERETO, AND METHOD FOR MANUFACTURING SAME

CROSS-REFERENCE TO PRIOR APPLICATIONS

This application is a National Stage Patent Application of PCT International Patent Application No. PCT/KR2019/007580 (filed on Jun. 24, 2019) under 35 U.S.C. § 371, which claims priority to Korean Patent Application No. 10-2018-0102266 (filed on Aug. 29, 2018), which are all hereby incorporated by reference in their entirety.

BACKGROUND

The present disclosure relates to a sole-type member such as a shoe sole or an insole and a method of manufacturing the same. More particularly, the present disclosure relates to a shoe sole or an insole in which a sheet-type coated cork having a plurality of main-body-coupling openings is laminated on and coupled with the main body of the shoe sole or the insole, and to a method of manufacturing the same.

A 'plate-shaped cork block' is manufactured using crushed cork pieces and a binder of a thermoplastic polymer, and the block is sliced to form sliced solid structures having a thickness of 0.2 to 1 mm, and a maximum thickness of 10 mm, which are already commercialized in various fields.

Cork slice sheets having such a small thickness are bonded to non-woven fabric or canvas as a reinforcing material on the rear surface thereof and made commercially available as products such as wallpaper, drawing boards, and cases.

Such a conventional cork product is in the form in which cork particles are mixed in a rubber compound, and has a high specific gravity of 0.9 g/cm³ or more. The cork particles exist in the form of small islands in a sea of rubber. That is, fine cork particles are scattered in the polymer.

Meanwhile, Korean Patent No. 10-1661515 titled "Method of manufacturing cork-synthetic-rubber-cured product" (registered on Sept. 26, 2016) has been proposed by the present inventor. This conventional technique is an advanced technique in which crushed cork pieces are coupled using a strongly cured rubber composition. However, the cork-synthetic-rubber-cured product manufactured thereby has a specific gravity of about 0.5 to 0.96 g/cc, which is relatively heavy, and empty spaces are not substantially formed between the crushed cork pieces of the cork-synthetic-rubber-cured product.

Meanwhile, in the conventional technique, there is no known technique of artificially forming empty spaces between the crushed cork pieces.

Therefore, in order to couple a conventional cork slice sheet to a member of another material and use the same, a method of coupling the two using an adhesive must be adopted, and in this case, buffing is required to increase the adhesive force.

However, such a coupling method using adhesion may be suitable for products in a static state, but is difficult to apply to the case of a shoe sole or an insole that is subjected to various dynamic activities.

This is because a rubber for a shoe midsole or a sponge for an insole requires high extensibility, while cork has a property in which it does not stretch.

Further, molding of a thermoplastic sponge of a conventional product essentially requires a two-step process of pressing of 'heat softening' and 'cooling to maintain shapes' in a mold, and due to this, there are problems of an increase in mold price and a decrease in production rotation.

Further, a product having a protruding design added to the surface of the insole is commercially available. However, this protruding design is generally attached to the surface of the insole using adhesion processing, and the attachment operation, which requires a secondary process, has problems in that 'molding/number of revolutions' and 'labor/expenses' are twice as high as those of an operation without the secondary process and in that the durability of the protruding design is reduced.

Accordingly, the present disclosure has been made keeping in mind the above problems occurring in the prior art, and the present disclosure is intended to provide a technique capable of overcoming defects in dynamic strength and wear resistance while incorporating a sheet-type coated cork in a shoe sole or an insole. The present disclosure aims to provide a product in which a main-body-coupling opening, which is an empty space, is artificially formed between crushed cork pieces of a sheet-type coated cork and a method of manufacturing the same. A sole-type body member, which is a main body of a shoe sole or an insole, is laminated on the sheet-type coated cork, and is then pressed and heated so that a part of the sole-type body member is inserted into the main-body-coupling opening, thereby achieving coupling therebetween.

In order to solve the above problems, the present disclosure includes preparing a crushed-cork-piece assembly, which is an assembly of crushed cork pieces having a diameter of 5 to 10 mm; forming a mixture of cork and latex for coating by mixing 30 to 50 parts by weight of a chloroprene rubber latex (having a solid concentration of 50% to 60%), 15 to 25 parts by weight of a natural rubber latex (having a solid concentration of 40% to 60%), 2 to 4 parts by weight of a stabilizer, 2 to 4 parts by weight of a wetting agent, 4 to 6 parts by weight of a thickener, and 1 to 3 parts by weight of a curing agent based on 100 parts by weight of the crushed-cork-piece assembly in a drum rotary mixer having no agitation blades; forming a block-type coated cork in which a plurality of main-body-coupling openings, which are empty spaces, are formed between the crushed cork pieces by naturally drying the mixture of cork and latex for coating and then performing curing so that a space occupancy ratio of the plurality of main-body-coupling openings is 10 to 60% based on an apparent volume of the block-type coated cork and so that an apparent specific gravity of the block-type coated cork is 0.12 to 0.35 g/cm³; slicing the block-type coated cork to obtain sheet-type coated cork having a thickness of 0.2 to 4 mm; laminating a sole-type body member, which is a main body of a shoe sole or an insole, on the sheet-type coated cork; and pressing and heating the sole-type body member laminated on the sheet-type coated cork so that a part of the sole-type body member is inserted into the main-body-coupling openings formed in the sheet-type coated cork to be coupled each other, thereby manufacturing the sole-type member in which a part of the sole-type body member is exposed through the main-body-coupling openings to an outside.

Another aspect of the present disclosure is to provide a shoe sole coupled with sheet-type coated cork. The shoe sole includes the sheet-type coated cork manufactured so as to have a sheet shape having a thickness of 0.2 to 4 mm by slicing block-type coated cork in which crushed cork pieces having a diameter of 5 to 10 mm are coupled with each other and a plurality of main-body-coupling openings, which are empty spaces, are formed between the crushed cork pieces using a latex for coating obtained by performing curing, and a main body of the shoe sole laminated on an upper portion of the sheet-type coated cork. A space occupancy ratio of the plurality of main-body-coupling openings is 10 to 60% based on an apparent volume of the block-type coated cork, an apparent specific gravity of the block-type coated cork is 0.12 to 0.35 g/cm$^3$, and a part of the main body of the shoe sole is inserted into the main-body-coupling openings in the sheet-type coated cork and is exposed through the main-body-coupling openings to the outside by pressing and heating to be coupled each other.

Another aspect of the present disclosure is to provide an insole coupled with a sheet-type coated cork. The insole includes the sheet-type coated cork, manufactured so as to have a sheet shape having a thickness of 0.2 to 4 mm by slicing block-type coated cork in which crushed cork pieces having a diameter of 5 to 10 mm are coupled with each other and a plurality of main-body-coupling openings, which are empty spaces, are formed between the crushed cork pieces using latex for coating obtained by performing curing, and a main body of the insole, laminated on a lower portion of the sheet-type coated cork. The space occupancy ratio of the plurality of main-body-coupling openings is 10 to 60% based on the apparent volume of the block-type coated cork, the apparent specific gravity of the block-type coated cork is 0.12 to 0.35 g/cm$^3$, and a part of the main body of the insole is inserted into the main-body-coupling openings in the sheet-type coated cork and is exposed through the main-body-coupling openings to the outside by pressing and heating to be coupled each other.

As described above, the present disclosure provides a product in which a main-body-coupling opening, which is an empty space, is artificially formed between crushed cork pieces of a sheet-type coated cork. A sole-type body member, which is a main body of a shoe sole or an insole, is laminated on the sheet-type coated cork, and is then pressed and heated so that a part of the sole-type body member is inserted into the main-body-coupling opening, thereby achieving coupling therebetween. Accordingly, it is possible to overcome defects in dynamic strength and wear resistance while incorporating a sheet-type coated cork in the shoe sole or the insole.

DETAILED DESCRIPTION

Figure 1:
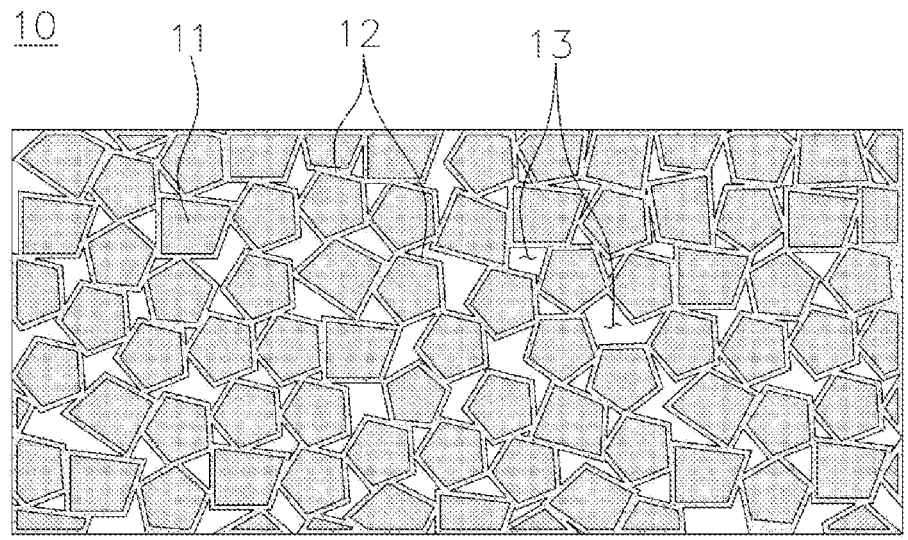
FIG. 1 is a cross-sectional conceptual view of a block-type coated cork manufactured according to an embodiment of the present disclosure.

Hereinafter, embodiments of the present disclosure will be described in detail with reference to the accompanying drawings so that those of ordinary skill in the art can easily implement the present disclosure. However, the present disclosure may be implemented in various different forms, and is not limited to the embodiments described herein. Further, in the drawings, parts not related to the description are omitted in order to clearly describe the present disclosure, and similar reference numerals are assigned to similar parts throughout the specification.

Throughout the specification, when a certain part is said to "include" a certain component, it means that other components may be further included, rather than excluding other components unless otherwise stated.

It is understood that the failure to provide a product in which an empty space is artificially formed between crushed cork pieces in the conventional technique is due to the following problems.

In order to artificially form the empty space between the crushed cork pieces, it is necessary to use crushed cork pieces having a sufficiently large size (when crushed cork pieces having a small size are used, there is no room for empty spaces to be formed.). However, most of the conventional techniques provide cork particles mixed in the rubber compound, so it is advantageous for the cork particles to be small. Therefore, most conventional techniques are techniques using crushed cork pieces having a sufficiently small size, rather than techniques for using crushed cork pieces having a sufficiently large size, that is, a diameter of 5 to 10 mm, as in the present disclosure.

Further, even when crushed cork pieces having a sufficiently large size are used, if the crushed cork pieces are mixed in a kneader or a roller together with synthetic rubber, the crushed cork pieces are broken by shearing force and thus become smaller, and as a result, empty spaces are not formed.

Further, even when crushed cork pieces having a sufficiently large size are appropriately mixed with synthetic rubber, a relatively large empty space (opening) that is formed in the manufactured cork-synthetic rubber product acts as a factor that significantly weakens the strength of the product, and thus the product has no recognizable value as a product.

The present disclosure is characterized in that crushed cork pieces having a sufficiently large size are mixed with a latex mixture for coating, without using a kneader or a roller, and thus proposes a new mixing method that is capable of maintaining the original shape of the crushed cork pieces. Moreover, a part of a sole-type body member is inserted into a main-body-coupling opening in a sheet-type coated cork, thereby increasing the dynamic strength and wear resistance of the product.

(1) Step of preparing crushed-cork-piece assembly

A crushed-cork-piece assembly, which is an assembly of crushed cork pieces having a diameter of 5 to 10 mm, is prepared.

Such crushed cork pieces having a relatively large diameter are also referred to as 'coarse-tree crushed cork pieces'.

(2) Step of forming mixture of cork and latex for coating

The crushed cork pieces and a latex mixture for coating are mixed with each other to form a mixture of cork and latex for coating.

100 parts by weight of a crushed-cork-piece assembly, 30 to 50 parts by weight of a chloroprene rubber latex (having a solid concentration of 50% to 60%), 15 to 25 parts by weight of a natural rubber latex (having a solid concentration of 40% to 60%), 2 to 4 parts by weight of a stabilizer, 2 to 4 parts by weight of a wetting agent, 4 to 6 parts by weight of a thickener, and 1 to 3 parts by weight of a curing agent are mixed in a drum rotary mixer having no agitation blades, thus forming a mixture of cork and latex for coating.

Chloroprene rubber latex is a colloidal aqueous dispersion material of chloroprene rubber, and natural rubber latex is a colloidal aqueous dispersion material of natural rubber.

When the amount of the chloroprene rubber latex (having a solid concentration of 50% to 60%) is more than 50 parts by weight or when the amount of the natural rubber latex (having a solid concentration of 40% to 60%) is more than 25 parts by weight, a main-body-coupling opening having a sufficient size is not formed in the block-type coated cork to be described later due to the increase in rubber solids.

Further, when the amount of the chloroprene rubber latex (having a solid concentration of 50% to 60%) is less than 30 parts by weight or when the amount of the natural rubber latex (having a solid concentration of 40% to 60%) is less than 15 parts by weight, the coupling force between the crushed cork pieces is insufficient in the block-type coated cork due to the decrease in rubber solids.

The stabilizer, the wetting agent, the thickener, and the curing agent are added at a weight ratio suitable for curing of the chloroprene rubber latex and the natural rubber latex.

The crushed cork pieces and the latex mixture for coating are mixed while being agitated at a low speed in a drum rotary mixer having no agitation blades in order to prevent the crushed cork pieces from breaking.

(3) Step of forming block-type coated cork

The mixture of cork and latex for coating is dried (in particular, the dispersion medium of the latex mixture for coating is dried and removed) and then cured, thus forming block-type coated cork in which a plurality of main-body-coupling openings, which are empty spaces, are formed between the crushed cork pieces.

Thereby, the surface of each of the crushed cork pieces is coated with the latex for coating and a coated crushed cork piece is coupled with another crushed cork piece through the latex for coating. A plurality of main-body-coupling openings, which are empty spaces, are formed between the crushed cork pieces, specifically between the latex for coating.

The block-type coated cork that is thus manufactured is very lightweight and has an apparent specific gravity of 0.12 to 0.35 g/cm$^3$. The space occupancy ratio of the plurality of main-body-coupling openings is 10 to 60%, based on the apparent volume of the block-type coated cork.

When the space occupancy ratio of the plurality of the main-body-coupling openings is more than 60% based on the apparent volume of the block-type coated cork, since the space occupancy ratio of the main-body-coupling openings is very high, the coupling force between the crushed cork pieces is greatly reduced, making it difficult to maintain the shape during slicing to be described later.

When the space occupancy ratio of the plurality of the main-body-coupling openings is less than 10% based on the apparent volume of the block-type coated cork, the ratio of insertion of the sole-type body member to be described later into the sheet-type coated cork is significantly lowered, thus reducing the coupling force with the sole-type body member.

FIG. 1 is a cross-sectional conceptual view of block-type coated cork manufactured according to an embodiment of the present disclosure.

In FIG. 1, a block-type coated cork 10 includes crushed cork pieces 11 and cured pieces of latex 12 for coating, and a plurality of main-body-coupling openings 13 is formed between the crushed cork pieces 11.

(4) Step of obtaining sheet-type coated cork

The block-type coated cork manufactured in the process (3) is sliced to obtain sheet-type coated cork having a thickness of 0.2 to 4 mm.

Figure 2:
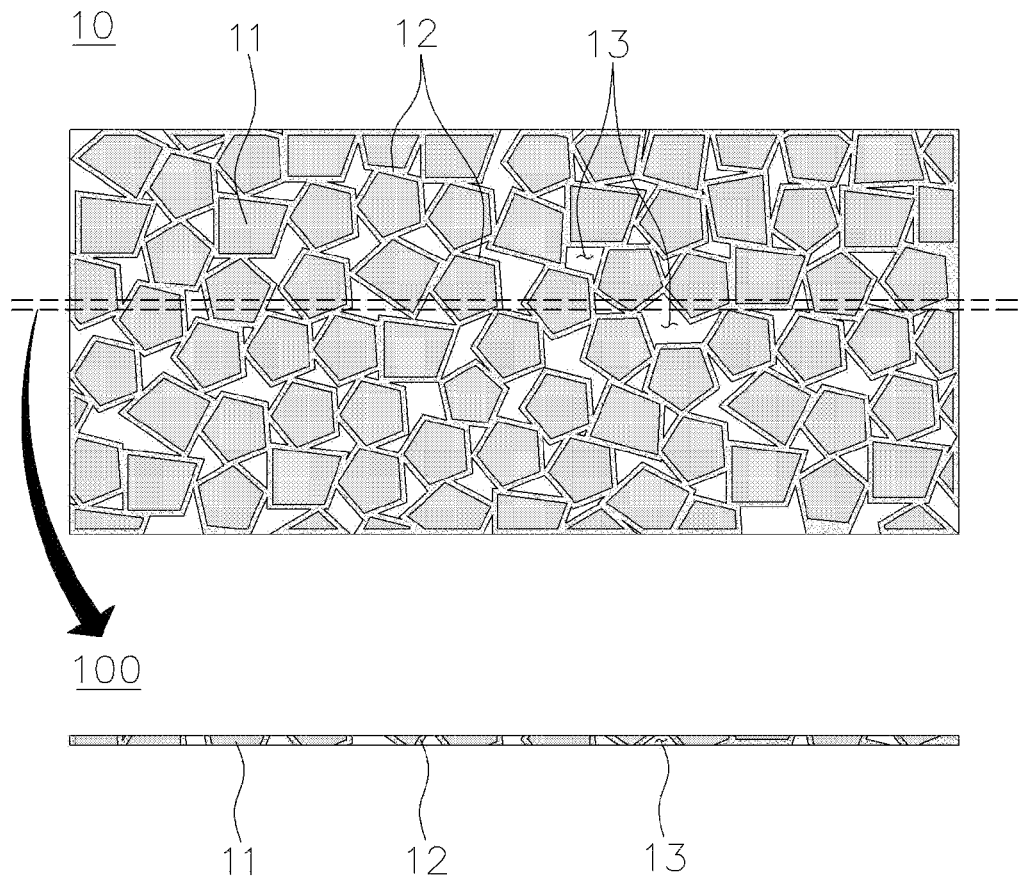
FIG. 2 is a cross-sectional conceptual view of a sheet-type coated cork obtained from the block-type coated cork of FIG. 1.

FIG. 2 is a cross-sectional conceptual view of a sheet-type coated cork 100 obtained from the block-type coated cork 10 of FIG. 1.

The sheet-type coated cork 100 includes crushed cork pieces 11 and cured pieces of latex 12 for coating, and a plurality of main-body-coupling openings 13 is formed between the crushed cork pieces 11.

Moreover, the latex 12 for coating does not exist on the sliced cross-sections of the crushed cork pieces 11, and the cork is exposed to the outside.

(5) Step of laminating sole-type body member

The sole-type body member is laminated on the sheet-type coated cork.

The sole-type body member corresponds to the main body of the shoe sole or the insole.

Figure 3:
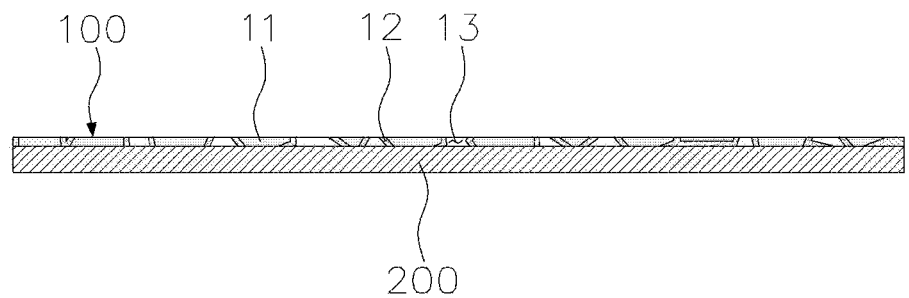
FIG. 3 is a cross-sectional conceptual view showing lamination of the sheet-type coated cork of FIG. 2 and a main body of an insole.

FIG. 3 is a cross-sectional conceptual view showing lamination of the sheet-type coated cork 100 and the main body 200 of the insole.

In the sole-type body member, the material currently used for the shoe sole or the insole is used.

When the sole-type body member is the main body of the shoe sole, a polyurethane sponge sole may be mainly adopted as the sole-type body member, and a sheet-type coated cork is laminated on the bottom side of the sole-type body member.

When the sole-type body member is the main body of the shoe sole, synthetic rubber, polyurethane rubber, or uncured dough may be applied to the sole-type body member.

When the sole-type body member is the main body of the insole, EVA sponge may be mainly adopted as the sole-type body member, and the sheet-type coated cork is laminated on the upper skin side of the sole-type body member.

When the sole-type body member is the main body of the insole, the sole-type body member may include a molded product of a thermoplastic sponge or uncured dough.

As conventional insoles, various products in which EVA sponge, foamed styrol, and canvas or nonwoven fabric are incorporated have been commercialized. These thermoplastic sponges are insulators including closed air bubbles, have a large charging capacity, cannot be electrostatically earthed, and have a large permanent deformation. The closed air bubbles are crushed when heated or pressed, which eliminates the ventilation and deodorizing functions thereof and causes hygiene problems such as the propagation of bacteria on the surface thereof.

The sheet-type coated cork is cut so as to have a sole shape, and the sole-type body member and the sheet-type coated cork may have the same shape.

According to the embodiment, the sheet-type coated cork may be cut so as to have a smaller area than the area of the sole-type body member, and may then be laminated on a plurality of points of the sole-type body member. That is, two, three, four, or a plurality of sheet-type coated corks may be disposed on different regions of the sole-type body member having the sole shape.

(6) Step of manufacturing sole-type member

In the state where the sole-type body member is laminated on the sheet-type coated cork, the sole-type body member is pressed and heated so that a part of the sole-type body member is inserted into the main-body-coupling opening formed in the sheet-type coated cork, thus coupling the sole-type body member and the sheet-type coated cork, thereby completing the sole-type member, that is, the insole or the shoe sole.

The thermoplastic sponge, which is the sole-type body member, and the sheet-type coated cork are combined and then pressed for 5 min±2 min while being heated to 160° C.±10° C.

The sole-type body member is plasticized and fluidized by pressing and heating of press molding, and fills the main-body-coupling opening in the sheet-type coated cork.

Accordingly, a part of the sole-type body member has an insertion portion that is exposed to the outside through the main-body-coupling opening in the sheet-type coated cork.

Of course, when the sole-type body member and the sheet-type coated cork are coupled using a press-molding process, it is possible to perform further molding for a cork design having a 3D structure suitable for the sole and a 'foot sole massage' function.

Figure 4:
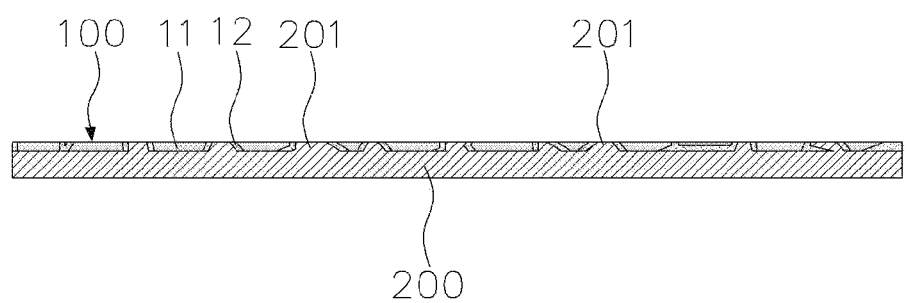
FIG. 4 is a cross-sectional conceptual view showing a state in which a part of the main body of the insole is inserted into the main-body-coupling opening in the sheet-type coated cork by pressing and heating the lamination of FIG. 3.

FIG. 4 is a cross-sectional conceptual view showing a state in which a part of the main body of the insole is inserted into the main-body-coupling opening in the sheet-type coated cork by pressing and heating the lamination of FIG. 3. That is, a part of the main body 200 of the insole is an insertion portion 201 that is inserted into the main-body-coupling opening in the sheet-type coated cork.

Figure 5:
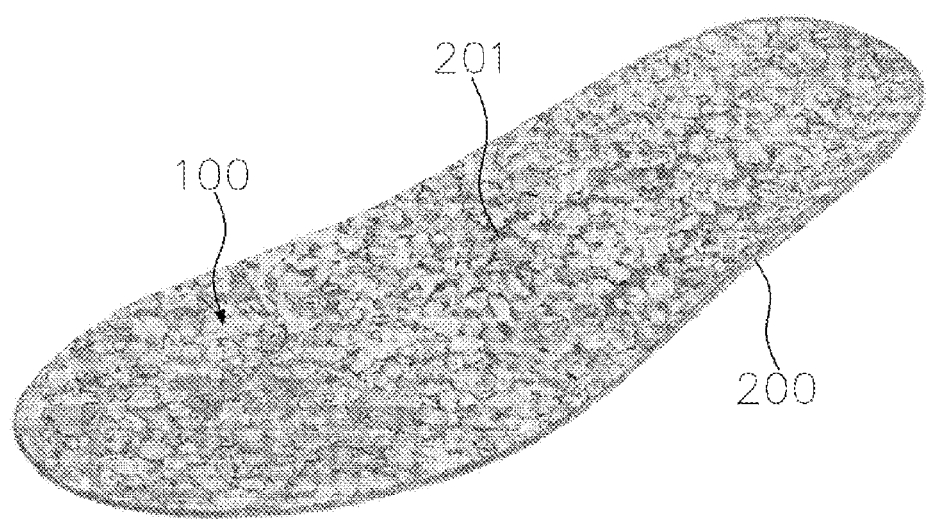
FIG. 5 is a photograph of the insole made in accordance with FIG. 4.

FIG. 5 is a photograph of the insole made in accordance with FIG. 4.

Figure 6:
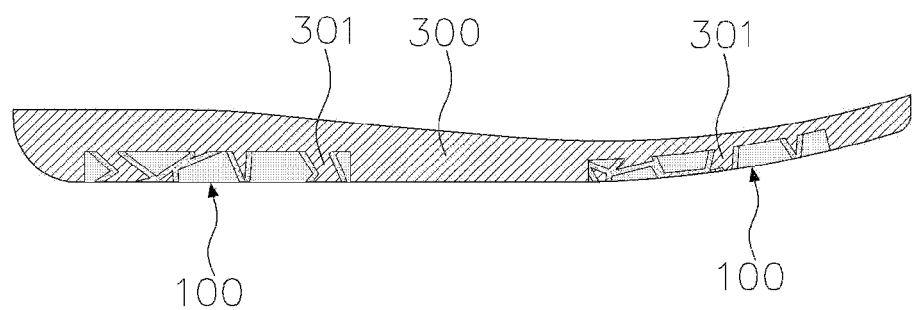
FIG. 6 is a cross-sectional conceptual view showing a state in which a part of the main body of a shoe sole according to an embodiment of the present disclosure is inserted into the main-body-coupling opening in the sheet-type coated cork.

FIG. 6 is a cross-sectional conceptual view showing the state in which a part of the main body 300 of a shoe sole according to an embodiment of the present disclosure is inserted into the main-body-coupling opening in the sheet-type coated cork.

A part of the main body 300 of the shoe sole forms an insertion portion 301 that is inserted into the main-body-coupling opening 13 in the sheet-type coated cork 100.

Figure 7:
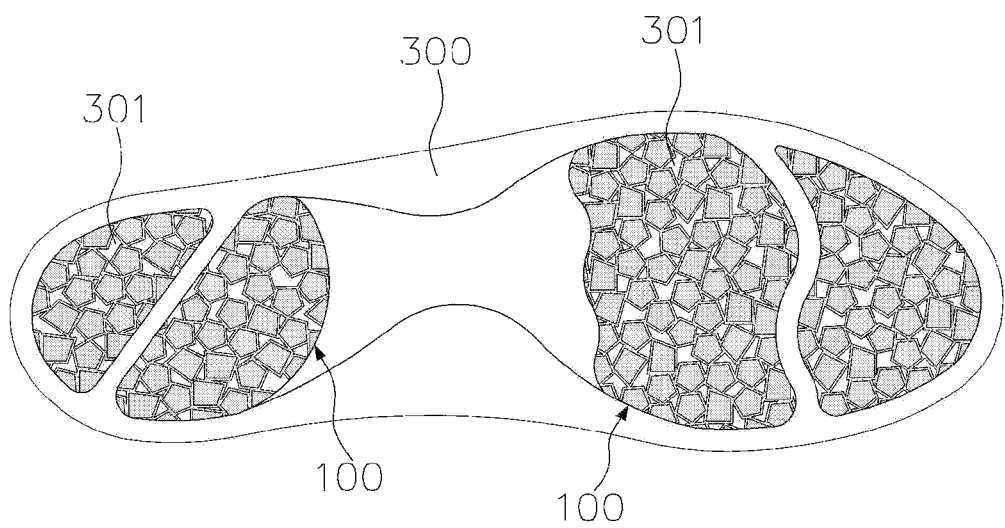
FIG. 7 is a bottom view of a shoe sole according to an embodiment of the present disclosure.

FIG. 7 is a bottom view of a shoe sole according to an embodiment of the present disclosure. As shown in the drawing, the sheet-type coated cork 100 is coupled with the shoe sole at a plurality of points thereof, and the insertion portion 301 of the main body 300 of the shoe sole is exposed to the outside through the sheet-type coated cork 100.

The moisture contained in the cork particles of the block-type coated cork is entirely vaporized and released due to the heat history of a heating process during curing. The trace of the release of vapor continuously forms air bubbles in the cork and the latex for coating, whereby the cork is imparted with a breathable structure to thus perform breathing as a sweating action, 20 to 40 million micropores are formed in 1 g/cm$^3$ of cells, and the cork has a deodorizing action and a sterilization action like activated carbon, thus ensuring a hygienic characteristic.

Further, the cork expands and contracts, and repeatedly breathes with respect to the atmosphere. The cork has the increased humidity (moisture) from the atmosphere due to the porosity thereof. Accordingly, when the cork is applied to an insole, the resultant insole becomes a 'power storage system' in which the insole instantly discharges static electricity charged to the human body. When the cork is applied to a shoe sole, the cork laminated on the bottom of the shoe sole is always earthed to the ground so that the system of discharging to the ground functions while walking on the ground.

That is, the cork has a deodorizing action and a sterilization action with respect to sweat and odors of the foot, and also has an earthing function to remove static electricity from the human body.

(a) The latex for coating is colored with an arbitrary pigment on the surface of the crushed cork pieces, (b) the sliced cross-section of the cork is uncolored, and (c) the coupling portions of the crushed cork pieces have a combination of colors forming networked structures. This forms a pattern similar to that of Mapa tofu having a combination of the independent colors of (a), (b), and (c), and creates an innovative design.

Further, with regard to strength, the sole-type body member is sufficiently exposed through the main-body-coupling opening in the sheet-type coated cork, thereby ensuring a reinforcing structure in which the outer network of the crushed cork pieces, that is, the weak coupling portions of the crushed cork pieces, are reinforced in terms of cushioning property and flexibility.

That is, the sole-type body member is exposed to the outside at a large ratio in proportion to the thickness of the sheet-type coated cork and the opening ratio of the main-body-coupling opening, which improves the wear resistance of the tread and prevents deformation of the crushed cork pieces, thus dramatically improving the overall physical strength.

Before the sheet-type coated cork and the sole-type body member are coupled, the main-body-coupling opening has fewer contact points with respect to the crushed cork pieces and the adhesion strength thereof is weak.

However, coupling the sheet-type coated cork and the sole-type body member eliminates the need to perform buffing to finish the sliced cross-section of the crushed cork pieces, and the main-body-coupling opening forms a strong three-dimensional adhesive structure. That is, the sole-type body member is inserted into the main-body-coupling opening, thus exhibiting very strong dynamic strength and peel strength.

Meanwhile, in the shoe sole, the perforations in the cross-section of the cork cause "wet floor anti-slip" frictional resistance. Moreover, the porous structure of cork containing the air has favorable cushioning and insulating properties, and it is possible to realize a shoe sole that floats in water. In particular, there is provided a unique shoe sole that is capable of being applied to safety and hygiene fields such as medical fields, pharmaceutical factories, IC parts factories, food factories, and sports.

The coupling structure of the sheet-type coated cork and the sole-type body member using the main-body-coupling opening may be applied to future products in new fields such as mats, flooring materials, and handles, in addition to insoles and shoe soles.

As described above, in the present disclosure, an adhesive, buffing processing, and a secondary process are not required, a primary process is omitted, and production costs and manufacturing costs of molds are reduced.

SPECIFIC EXAMPLE

Hereinafter, a specific Example according to the present disclosure will be described.

Block-Type Coated Cork and Sheet-Type Coated Cork

A crushed-cork-piece assembly in which a distribution ratio of crushed cork pieces having a diameter of 5 to 10 mm was 70% or more was prepared. The crushed cork pieces were imported from Portugal.

Based on 100 parts by weight of this crushed-cork-piece assembly, 40 parts by weight of a chloroprene rubber latex (having a solid concentration of 60%) (Brand name: Shuprene), 18 parts by weight of a natural rubber latex (low, ammonia concentration of 0.25%, solid concentration of 60%), 3 parts by weight of a stabilizer (Brand name: Nonipol, Component: Polyoxyethylen ● nonylphenyl/ether), 3 parts by weight of a wetting agent (Brand name: Leonil, Component: Alkylnaphthalene/sulfonate), 5 parts by weight of a thickener (Brand name: Latekoil-AS, Component: Ammonium/salt), 3 parts by weight of a pigment (Molybden-red), and 2 parts by weight of a curing agent (sulfur) were weighed to form a total of 1000 liters of a latex mixture solution for coating.

For 1 liter of the latex mixture solution for coating, a drum rotary mixer having no agitation blades (Yamatonoji Co., Ltd., Product name: Gorudo, 25-liter small mixer, and rotation speed of 25 rpm) was used, a drum was rotated for 5 minutes, and the crushed cork pieces were divided into two batches, which were added separately. The mixing was performed for a total of 15 minutes while stopping rotation every time the crushed cork pieces were added, thereby forming the mixture of cork and latex for coating according to the parts by weight described above.

Through the mixing, the red crushed cork pieces became a red-orange mixture of cork and latex for coating and also became a composition having adhesiveness between the crushed cork pieces included therein, and in the case of the cork particles, the original shape thereof was maintained without damage.

After obtaining the mixture of cork and latex for coating in the same manner as above, 2 kg 800 g of the mixture of cork and latex for coating was charged in a wooden frame with a net at the bottom thereof (internal dimensions: 1000×1000×20 mm).

This mixture of cork and latex for coating was piled higher than the wooden frame, and was naturally dried at an ambient temperature of 20° C. for 24 hours. After the natural drying, a pressing plate of a PVC flat plate (1000×1000×5 mm) as an upper cover was placed thereon, and two persons of 65 kg stepped thereon so as to ensure an adhesive state in which a small amount of moisture remained, thereby easily achieving caking and solidification. In this process, 70 to 80% of the dispersion medium of the latex for coating was removed.

The composition that was caked, solidified, and dried was charged in the shaped body of the bottom plate (1300×1300×5 mm dimension) of an aluminum frame mold (internal dimension: 1000×1000×12 mm), an aluminum plate of 1300×1300×5 mm as an upper cover was placed thereon, and the mold was inserted into a steam press so as to perform curing under a molding condition including a vapor pressure of 8 kgf/cm² (175° C.) and a pressing time of 20 min (including air removal performed two times, for 3 minutes and 18 minutes respectively). The molded article was taken out from the mold, and the shape and dimensions thereof were measured.

The weight of the molded article formed as described in the preceding paragraph was 2 kg 400 g. After aging and cooling for 24 hours, a molded article, that is, a block-type coated cork, having dimensions of 998×998×11.5 mm and an apparent specific gravity of 0.209 g/cm³ was manufactured. A plurality of main-body-coupling openings accounted for 19% based on the apparent volume of the block-type coated cork.

The block-type coated cork was sliced using an EVA-sponge-slicing machine, thus manufacturing sheet-type coated cork having a thickness of 1.5 mm.

Application to Insole

A plate-type EVA sponge having a thickness of 8 mm and a sheet-type coated cork having a thickness of 1.5 mm were obtained so as to have the same cut form. The EVA sponge and the sheet-type coated cork were added into a mold for insole 3D molding and stacked so as to be positioned at a lower layer and an upper layer, respectively, and were pressed (80 kgf/cm³) in a heating molding machine at a hot-plate, the temperature of which was adjusted to 150° C., for 5 minutes (primary), that is, under press-molding conditions, thus manufacturing a 3D insole.

The conventional EVA sponge needs to be solidified into a predetermined shape in a cooling device because of the thermoplasticity thereof. However, in the present Example, a secondary cooling process is unnecessary, and accordingly, it is possible to more than double the productivity compared to the conventional technique.

At a temperature of 150 to 180° C., the cork of the present Example does not soften and expand, and the original shape thereof is maintained, but thermoplastic sponges such as the EVA sponge soften and closed air bubbles therein expand, making it impossible to maintain the original shape thereof. However, the EVA sponge (or uncured dough) that is inserted into the main-body-coupling openings in the sheet-type coated cork is coupled with the main-body-coupling openings in the sheet-type coated cork, like a foundation pile placed into the ground, and fill the opening as an adhesive. Therefore, the cork has the same type of skin frictional force as a foundation pile (friction pile) in the field of civil engineering, and the flow deterrent of the plasticized polymer functions at the same time as curing ends.

The main-body-coupling opening in the present disclosure is based on adoption of the above principle, and a natural phenomenon of rapid cooling occurring at the moment when the mold is opened and the inside thereof comes into contact with the air is adopted, thereby completing an insole having a 3D structure incorporating cork therein and having the shape based on the design dimensions.

Of course, instead of the EVA sponge, another kind of thermoplastic sponge or uncured dough may be employed as the main body of the insole.

The above description of the present disclosure is for illustrative purposes only, and it is to be understood that those of ordinary skill in the art to which the present disclosure pertains can easily devise modifications into other specific forms without changing the technical spirit or essential features of the present disclosure. Therefore, it should be understood that the embodiments described above are illustrative in all respects and not limiting. For example, each component described as a single type may be implemented in a distributed manner, and similarly, components described as being distributed may be implemented in a combined form.

The scope of the present disclosure is indicated by the claims to be set forth below rather than the detailed description, and all changes or modified forms derived from the meaning and scope of the claims and their equivalent concepts should be interpreted as being included in the scope of the present disclosure.

The present disclosure may be used to manufacture a shoe sole or an insole that is a part of a shoe.

The invention claimed is:

1. A method of manufacturing a sole-type member coupled with a sheet-type coated cork, the method comprising:
    preparing a crushed-cork-piece assembly, which is an assembly of crushed cork pieces each having a diameter of 5 to 10 mm;
    forming a mixture of cork and latex for coating by mixing 30 to 50 parts by weight of a chloroprene rubber latex (having a solid concentration of 50% to 60%), 15 to 25 parts by weight of a natural rubber latex (having a solid concentration of 40% to 60%), 2 to 4 parts by weight of a stabilizer, 2 to 4 parts by weight of a wetting agent, 4 to 6 parts by weight of a thickener, and 1 to 3 parts by weight of a curing agent based on 100 parts by weight of the crushed-cork-piece assembly in a drum rotary mixer having no agitation blades;
    forming a block-type coated cork in which a plurality of main-body-coupling openings, which are empty spaces, are formed between the crushed cork pieces by naturally drying the mixture of cork and latex for coating and then performing curing so that a space occupancy ratio of the plurality of the main-body-coupling openings is 10 to 60% based on an apparent volume of the block-type coated cork and so that an apparent specific gravity of the block-type coated cork is 0.12 to 0.35 g/cm$^3$;
    slicing the block-type coated cork to obtain the sheet-type coated cork having a thickness of 0.2 to 4 mm;
    laminating a sole-type body member, which is a main body of a shoe sole or an insole, on the sheet-type coated cork; and
    pressing and heating the sole-type body member laminated on the sheet-type coated cork, so that a part of the sole-type body member is inserted into the main-body-coupling openings formed in the sheet-type coated cork to be coupled each other, thereby manufacturing the sole-type member in which the part of the sole-type body member is exposed through the main-body-coupling openings to an outside.

2. A shoe sole coupled with a sheet-type coated cork, comprising:
    the sheet-type coated cork manufactured so as to have a sheet shape having a thickness of 0.2 to 4 mm by slicing a block-type coated cork in which crushed cork pieces having a diameter of 5 to 10 mm are coupled with each other and a plurality of main-body-coupling openings, which are empty spaces, are formed between the crushed cork pieces using a latex for coating obtained by performing curing; and
    a main body of the shoe sole laminated on an upper portion of the sheet-type coated cork,
    wherein a space occupancy ratio of the plurality of the main-body-coupling openings is 10 to 60% based on an apparent volume of the block-type coated cork, an apparent specific gravity of the block-type coated cork is 0.12 to 0.35 g/cm$^3$, and a part of the main body of the shoe sole is inserted into the main-body-coupling openings in the sheet-type coated cork and is exposed through the main-body-coupling openings to an outside by pressing and heating to be coupled each other.

3. An insole coupled with a sheet-type coated cork, comprising:
    the sheet-type coated cork manufactured so as to have a sheet shape having a thickness of 0.2 to 4 mm by slicing a block-type coated cork in which crushed cork pieces having a diameter of 5 to 10 mm are coupled with each other and a plurality of main-body-coupling openings, which are empty spaces, are formed between the crushed cork pieces using a latex for coating obtained by performing curing; and
    a main body of the insole laminated on a lower portion of the sheet-type coated cork,
    wherein a space occupancy ratio of the plurality of main-body-coupling openings is 10 to 60% based on an apparent volume of the block-type coated cork, an apparent specific gravity of the block-type coated cork is 0.12 to 0.35 g/cm$^3$, and a part of the main body of the insole is inserted into the main-body-coupling openings in the sheet-type coated cork and is exposed through the main-body-coupling openings to an outside by pressing and heating to be coupled each other.

* * * * *